(12) United States Patent
Yasui

(10) Patent No.: US 7,221,519 B2
(45) Date of Patent: May 22, 2007

(54) ZOOM LENS SYSTEM AND IMAGE PICKUP APPARATUS INCLUDING THE SAME

(75) Inventor: Hiroto Yasui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/445,068

(22) Filed: May 31, 2006

(65) Prior Publication Data

US 2006/0279851 A1     Dec. 14, 2006

(30) Foreign Application Priority Data

Jun. 9, 2005     (JP)     ............... 2005-169344

(51) Int. Cl.
*G02B 15/14*     (2006.01)
(52) U.S. Cl. ..................... 359/689; 359/680
(58) Field of Classification Search ............... 359/689, 359/680, 682
See application file for complete search history.

(56) References Cited

U.S. PATENT DOCUMENTS

| | | | |
|---|---|---|---|
| 6,917,476 B2 | 7/2005 | Eguchi | |
| 7,085,067 B2 * | 8/2006 | Enomoto | ............... 359/680 |
| 2004/0189832 A1 | 9/2004 | Hagimori | |
| 2004/0263995 A1 | 12/2004 | Adachi | |
| 2005/0013016 A1 | 1/2005 | Nakatani | |
| 2005/0046960 A1 | 3/2005 | Saori | |
| 2005/0046961 A1 | 3/2005 | Saori | |

FOREIGN PATENT DOCUMENTS

| | | |
|---|---|---|
| EP | 1505423 A1 | 2/2005 |
| JP | 2003-177314 A | 6/2003 |
| JP | 2003-177315 A | 6/2003 |
| JP | 2004-004765 A | 1/2004 |
| JP | 2004-133058 A | 4/2004 |
| JP | 2004-318098 A | 11/2004 |

\* cited by examiner

*Primary Examiner*—Scott J. Sugarman
*Assistant Examiner*—Jack Dinh

(57) ABSTRACT

A zoom lens system includes a frontmost first lens unit having a negative optical power and a plurality of lens units on the rear side thereof. The first lens unit consists of a negative lens element. The zoom lens system includes five or less lens elements in total. The Abbe number of the negative lens element and the exit pupil distance of the zoom lens system at a wide-angle end are appropriately adjusted.

10 Claims, 7 Drawing Sheets

ZOOM LENS SYSTEM AND IMAGE PICKUP APPARATUS INCLUDING THE SAME

BACKGROUND OF THE INVENTION

1. Field of the Invention

The present invention relates to zoom lens systems suitable for, for example, compact image pickup apparatuses such as digital cameras and image pickup units for cellular phones and personal digital assistants (PDAs).

2. Description of the Related Art

Image pickup apparatuses such as digital cameras and image pickup units for cellular phones and PDAs have an imaging optical system including an image pickup element such as a charge-coupled device (CCD) sensor or a complementary metal oxide semiconductor (CMOS) sensor. A lens system with a relatively long back focus is demanded of the imaging optical system because it also includes various optical members, such as a low-pass filter and a color correction filter, between the image pickup element and the rearmost lens part. On the other hand, a compact, wide-angle lens system is demanded for size reduction of the entire apparatus using an image pickup element having a relatively small effective light-receiving area.

Simple, compact zoom lenses for use in compact image pickup apparatuses are disclosed in, for example, Japanese Patent Laid-Open Nos. 2003-177314 (Patent Document 1), 2004-4765 (Patent Document 2), 2003-177315 (Patent Document 3), 2004-133058 (Patent Document 4), and 2004-318098 (Patent Document 5). These zoom lenses are negative-lead zoom lenses, including a frontmost lens unit with a negative refractive power.

Zoom lenses according to embodiments disclosed in Patent Document 1 include only three lenses and exhibit poor optical performance.

Zoom lenses according to embodiments disclosed in Patent Document 2 include six lenses and exhibit relatively good optical performance. These zoom lenses, however, have a large total lens length and are thus unsatisfactory in terms of size reduction.

Lens systems according to embodiments disclosed in Patent Document 3 have a relatively high zoom ratio, namely, about 2.5×, but are unsatisfactory in terms of size reduction.

Lens systems according to embodiments disclosed in Patent Document 4 are satisfactory in terms of size reduction, but have a relatively low zoom ratio, namely, about 2.0×. In addition, these lens systems are difficult to use directly for image pickup elements of optical apparatuses such as digital cameras because the systems are mainly intended for image pickup elements of cellular phones and PDAs.

Lens systems according to embodiments disclosed in Patent Document 5 have a high zoom ratio, namely, about 3.0× to 5.0×, although these systems include many lenses and are thus unsatisfactory in terms of size reduction.

In general, a larger number of lenses of each lens unit included in a zoom lens increases the length of the lens unit along the optical axis thereof, and a larger amount of movement of each lens unit in zooming and focusing increases the total lens length of the zoom lens.

SUMMARY OF THE INVENTION

The present invention provides a zoom lens system having a desired zoom ratio and high optical performance despite including fewer lenses.

A zoom lens system according to an embodiment of the present invention includes a frontmost first lens unit having a negative optical power and a plurality of lens units on the rear side of the first lens unit. The first lens unit consists of a negative lens element. The zoom lens system includes five or less lens elements in total. The zoom lens system satisfies the following conditions:

$$58 < vd1$$

$$0.10 < |tkw/tlw| < 0.70$$

wherein $vd1$ is the Abbe number of the negative lens element, $tkw$ is the distance from the rearmost lens surface to an exit pupil at a wide-angle end, and $tlw$ is the total lens length of the zoom lens system at the wide-angle end.

Further features of the present invention will become apparent from the following description of exemplary embodiments with reference to the attached drawings.

DESCRIPTION OF THE EMBODIMENTS

Zoom lens systems and an image pickup apparatus according to embodiments of the present invention will now be described with reference to the drawings.

Figure 1:
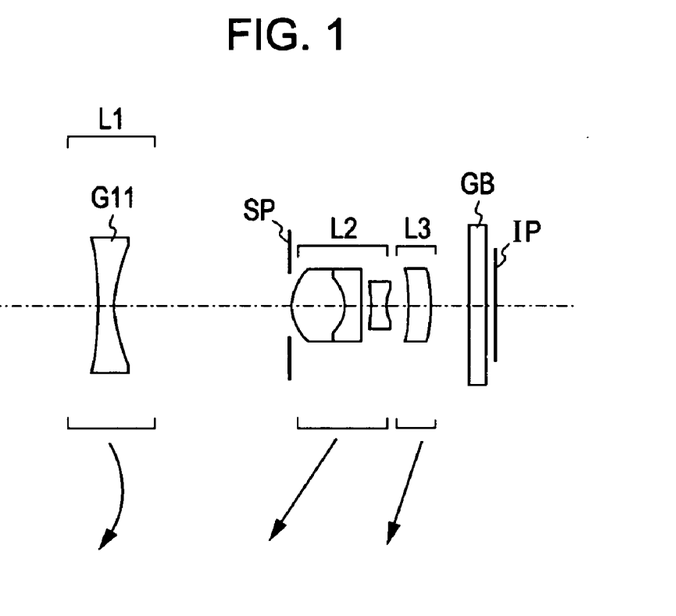
FIG. 1 is a sectional view of a zoom lens according to a first embodiment of the present invention.
Figure 2:
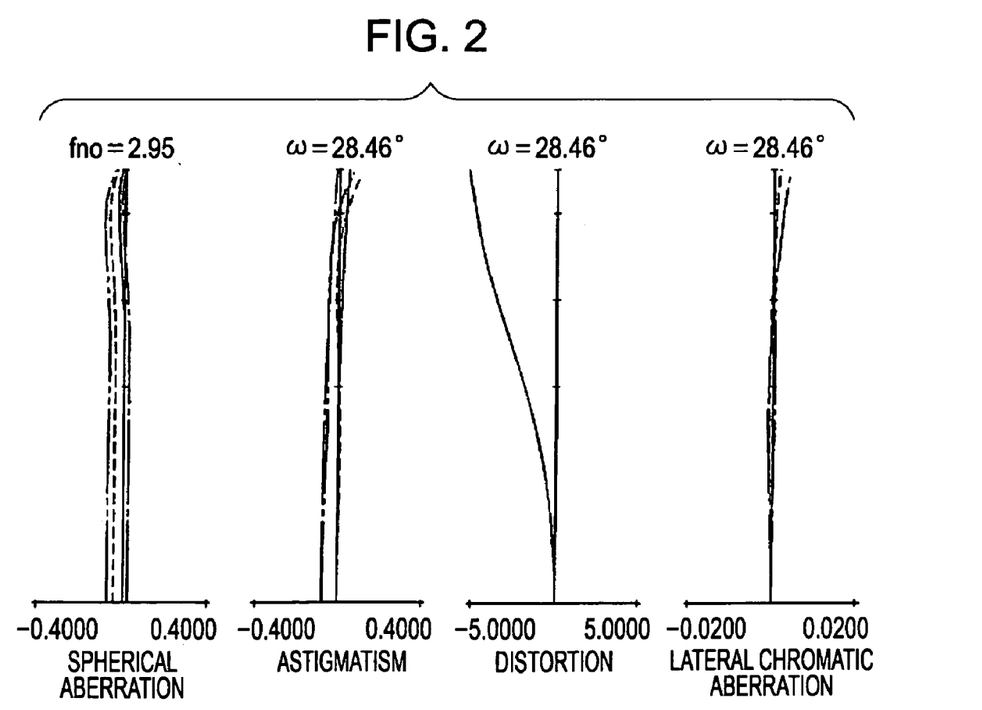
FIG. 2 is a set of graphs of aberrations caused at the wide-angle end of the zoom lens according to the first embodiment.
Figure 3:
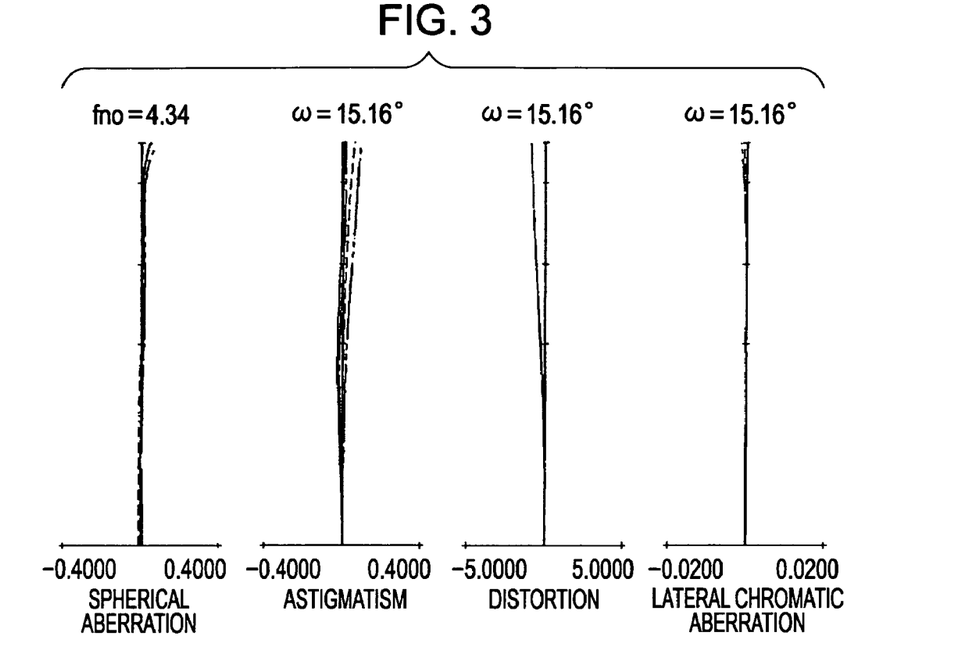
FIG. 3 is a set of graphs of aberrations caused at an intermediate zoom position of the zoom lens according to the first embodiment.
Figure 4:
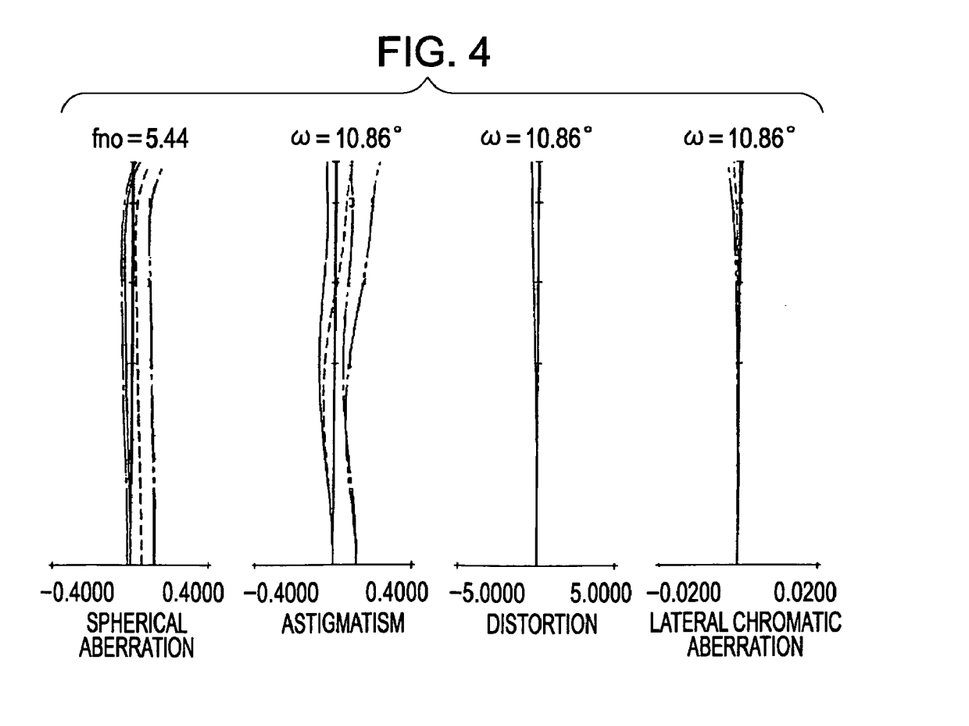
FIG. 4 is a set of graphs of aberrations caused at the telephoto end of the zoom lens according to the first embodiment.

FIG. 1 is a sectional view of a zoom lens according to a first embodiment of the present invention at a wide-angle end (the end of the zoom range with the smallest focal length). FIG. 2 is a set of graphs of aberrations caused at the wide-angle end of the zoom lens. FIG. 3 is a set of graphs of aberrations caused at an intermediate zoom position of the zoom lens. FIG. 4 is a set of graphs of aberrations caused at the telephoto end of the zoom lens (the end of the zoom range with the largest focal length). The zoom lens according to the first embodiment has a zoom ratio of 2.82× and an F-number of about 2.95 to 5.44.

Figure 5:
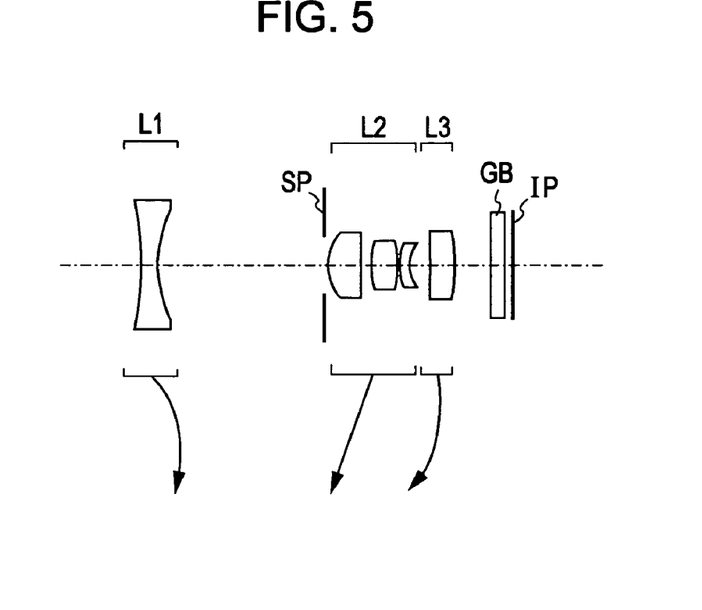
FIG. 5 is a sectional view of a zoom lens according to a second embodiment of the present invention.
Figure 6:
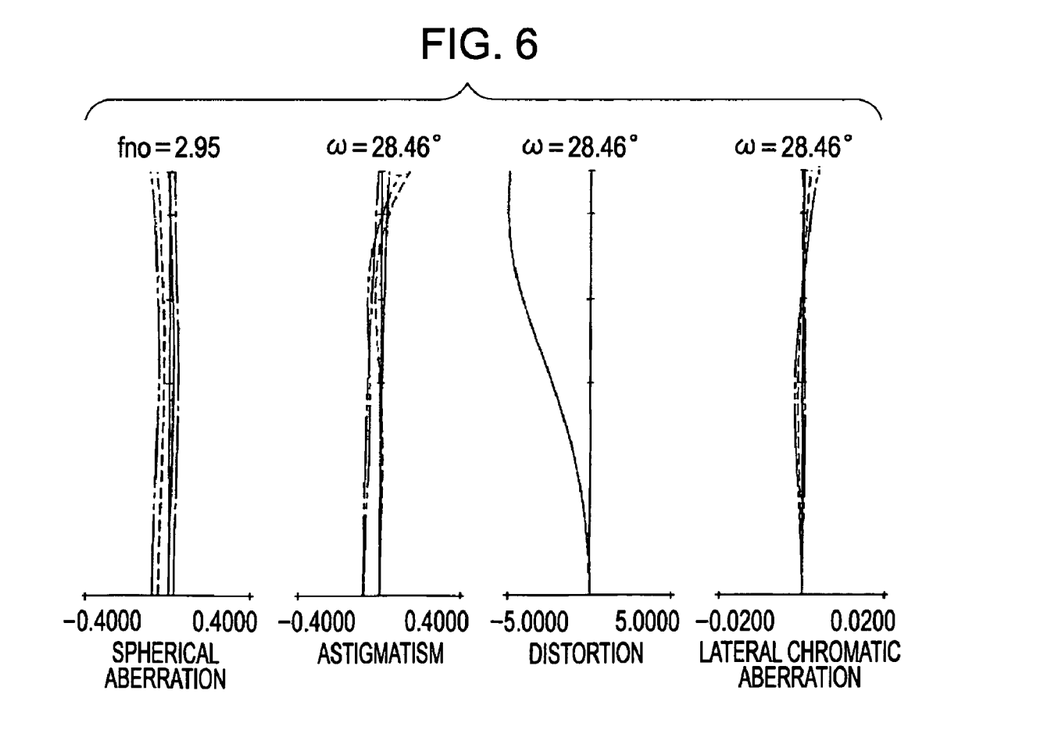
FIG. 6 is a set of graphs of aberrations caused at the wide-angle end of the zoom lens according to the second embodiment.
Figure 7:
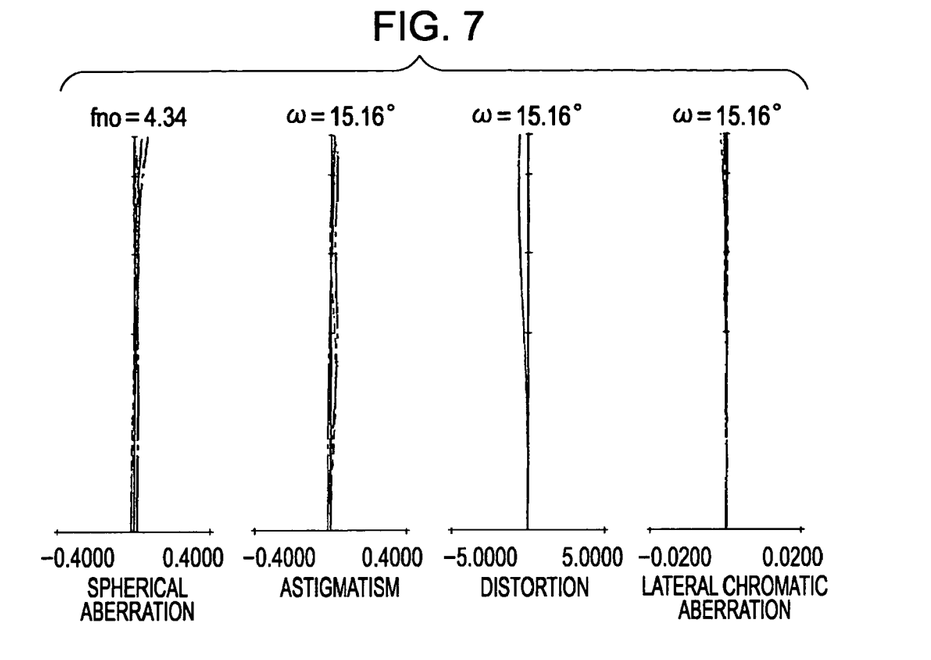
FIG. 7 is a set of graphs of aberrations caused at an intermediate zoom position of the zoom lens according to the second embodiment.
Figure 8:
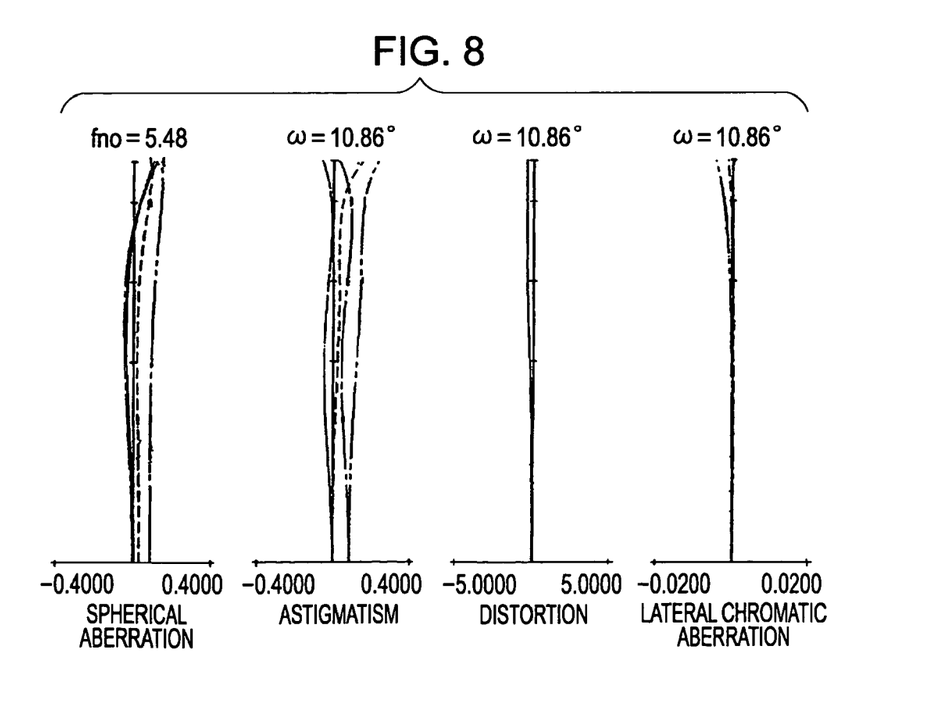
FIG. 8 is a set of graphs of aberrations caused at the telephoto end of the zoom lens according to the second embodiment.

FIG. 5 is a sectional view of a zoom lens according to a second embodiment of the present invention at the wide-angle end. FIG. 6 is a set of graphs of aberrations caused at the wide-angle end of the zoom lens. FIG. 7 is a set of graphs of aberrations caused at an intermediate zoom position of the zoom lens. FIG. 8 is a set of graphs of aberrations caused at the telephoto end of the zoom lens. The zoom lens according to the second embodiment has a zoom ratio of 2.83× and an F-number of about 2.95 to 5.48.

Figure 9:
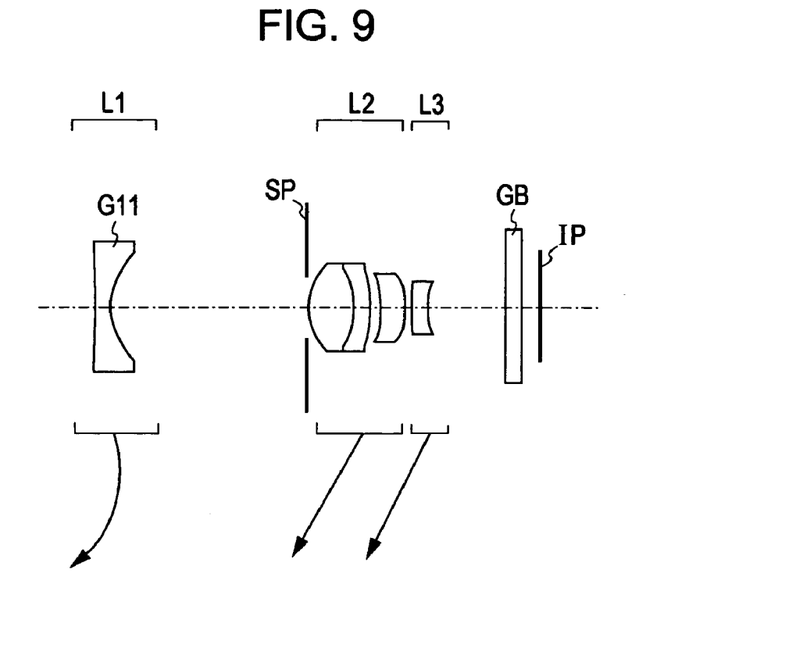
FIG. 9 is a sectional view of a zoom lens according to a third embodiment of the present invention.
Figure 10:
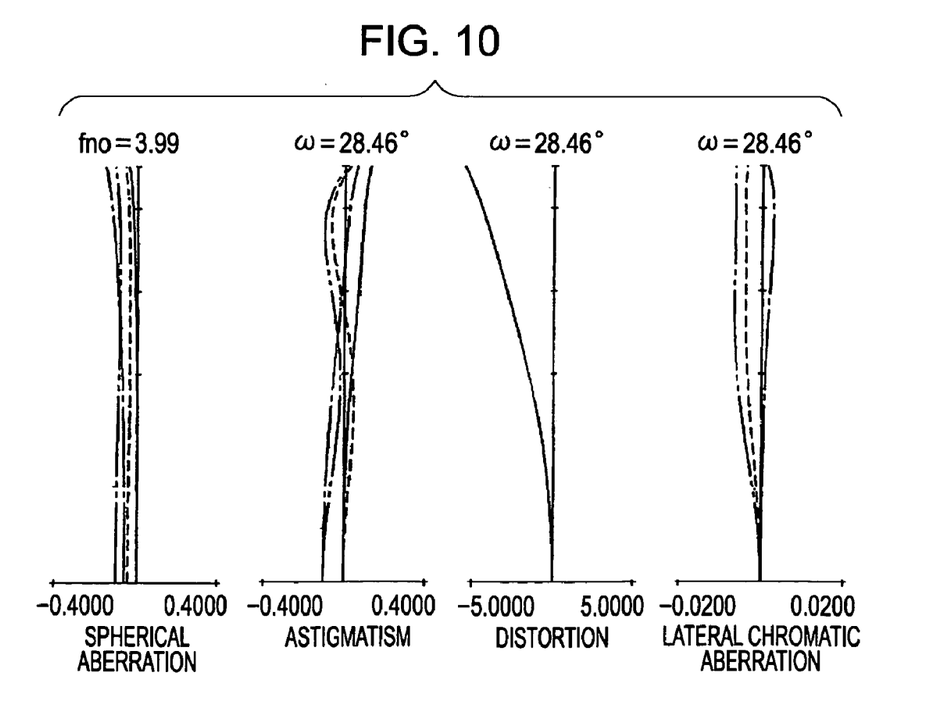
FIG. 10 is a set of graphs of aberrations caused at the wide-angle end of the zoom lens according to the third embodiment.
Figure 11:
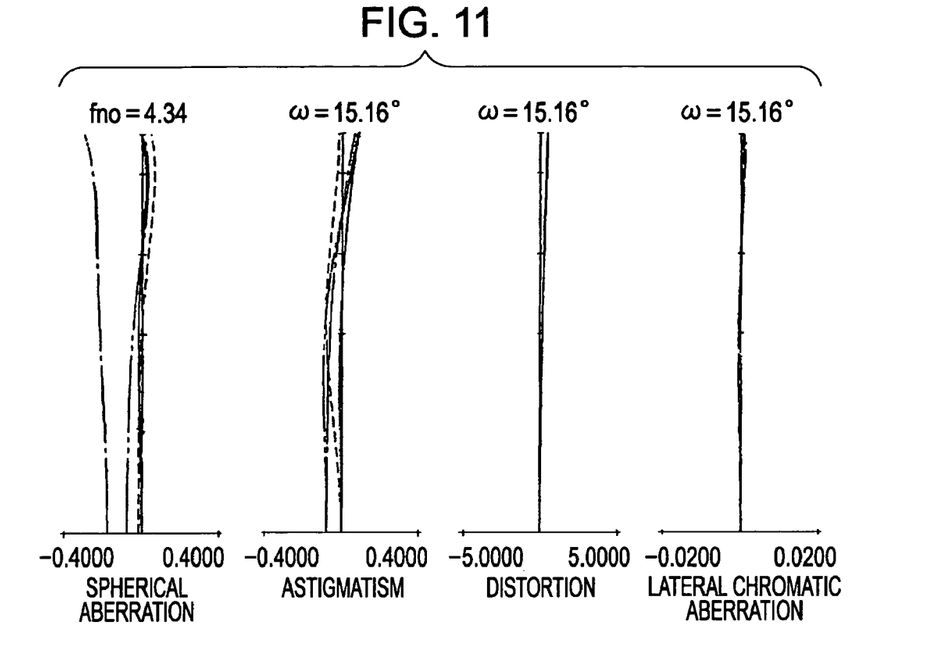
FIG. 11 is a set of graphs of aberrations caused at an intermediate zoom position of the zoom lens according to the third embodiment.
Figure 12:
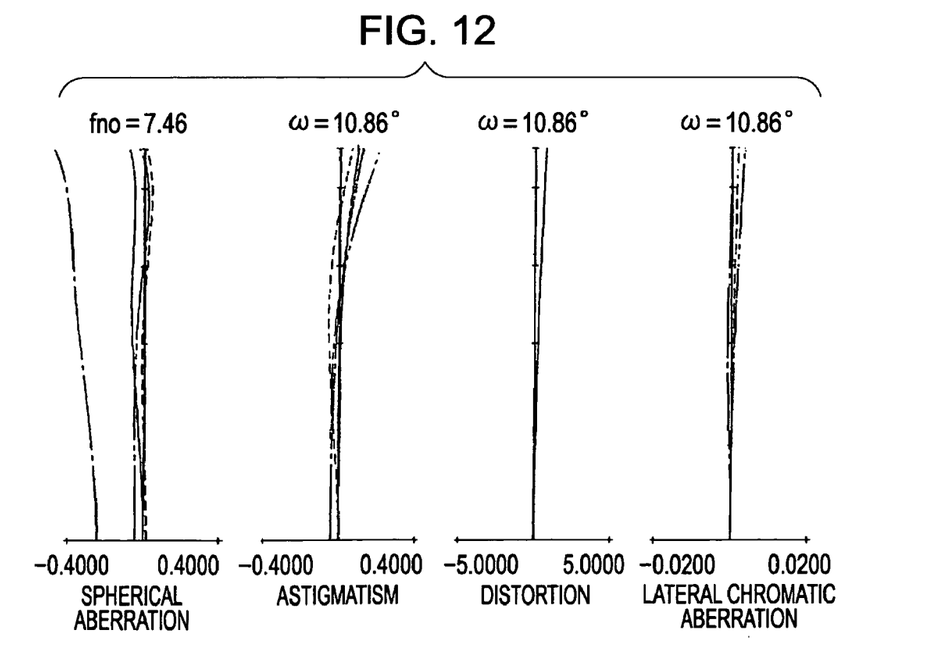
FIG. 12 is a set of graphs of aberrations caused at the telephoto end of the zoom lens according to the third embodiment.

FIG. 9 is a sectional view of a zoom lens according to a third embodiment of the present invention at the wide-angle end. FIG. 10 is a set of graphs of aberrations caused at the wide-angle end of the zoom lens. FIG. 11 is a set of graphs of aberrations caused at an intermediate zoom position of the zoom lens. FIG. 12 is a set of graphs of aberrations caused at the telephoto end of the zoom lens. The zoom lens according to the third embodiment has a zoom ratio of 2.83× and an F-number of about 3.99 to 7.46.

Figure 13:
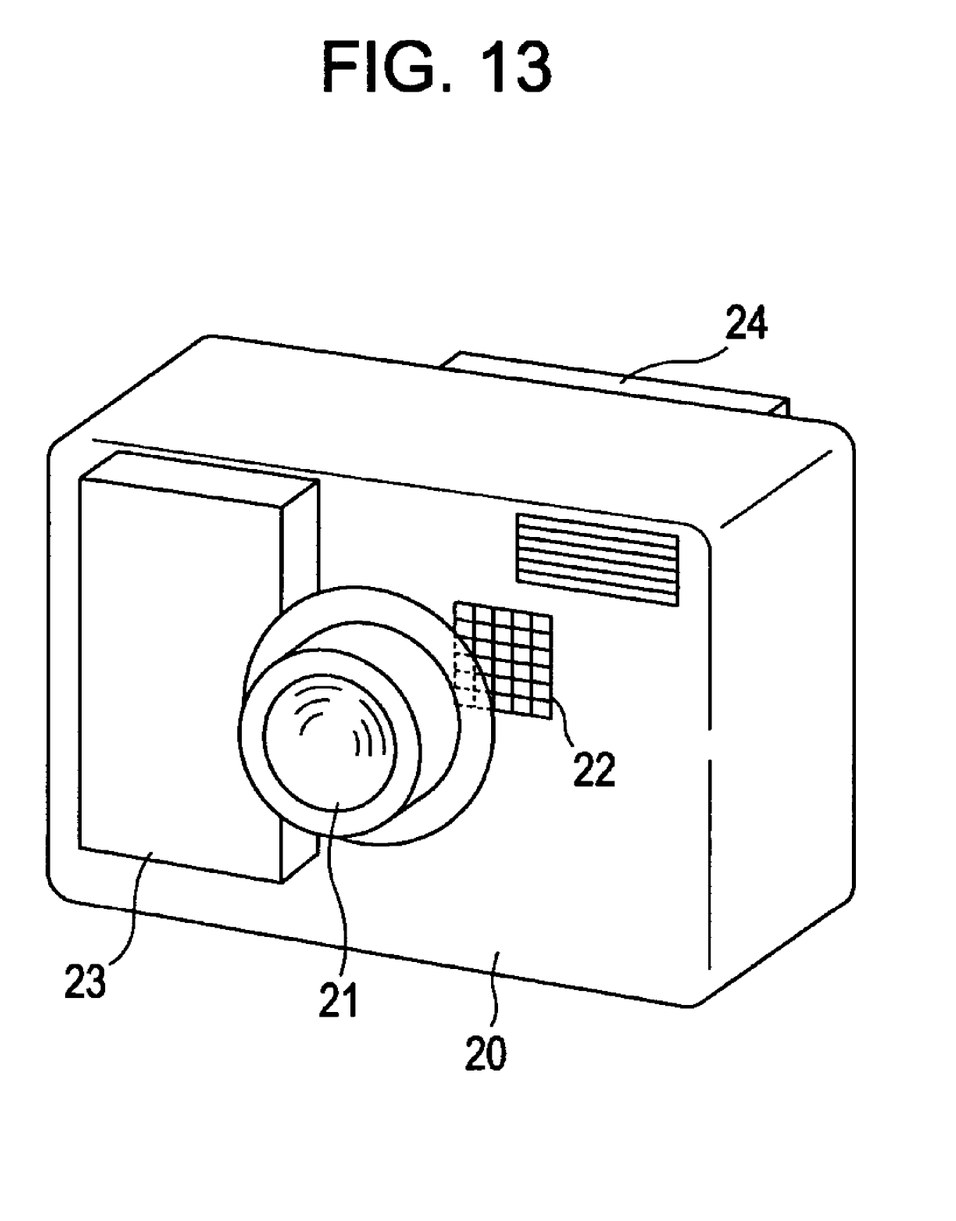
FIG. 13 is a schematic diagram of an image pickup apparatus according to an embodiment of the present invention.

FIG. 13 is a schematic diagram of a digital still camera (image pickup apparatus) including a zoom lens according to an embodiment of the present invention.

The zoom lenses according to the embodiments are imaging lens systems for use in image pickup apparatuses. In the sectional views of FIGS. 1, 5, and 9, the left side of the zoom lens system is the object (front) side, and the right side is the image (rear) side. Zoom lens systems according to the present invention may also be applied to, for example, projection lenses for use in liquid crystal projectors. In such a case, the front side of the systems corresponds to the screen side and the rear side corresponds to the original image (liquid crystal panel) side.

In the sectional views of FIGS. 1, 5, and 9, the zoom lenses each include a first lens unit L1 having a negative refractive power (an optical power represented as the reciprocal of focal length), a second lens unit L2 having a positive refractive power, a third lens unit L3 having a positive or negative refractive power, and an aperture stop (diaphragm) SP disposed on the object side of the second lens unit L2.

The zoom lens also includes an optical block GB including an optical filter, a faceplate, a quartz low-pass filter, and an infrared cut filter, for example, and an image plane IP. If the zoom lens is used as an imaging optical system for camcorders or digital still cameras, an imaging surface of a solid-state image pickup element (photoelectric transducer), such as a CCD sensor or a CMOS sensor, is positioned in the image plane IP.

In the graphs of aberrations, fno indicates an F-number and ω indicates a half-angle of view. In the graphs of spherical aberration, the solid line indicates the d-line, the chain line indicates the F-line, the one-dot chain line indicates the C-line, and the two-dot chain line indicates the g-line. In the graphs of astigmatism, the solid-line indicates a sagittal plane of the d-line, the chain line indicates a meridional plane of the d-line, the one-dot chain line indicates a sagittal plane of the g-line, and the two-dot chain line indicates a meridional plane of the g-line. In the graphs of distortion, the solid line indicates the d-line. In the graphs of lateral chromatic aberration, the chain line indicates the F-line, the one-dot chain line indicates the C-line, and the two-dot chain line indicates the g-line.

In the description of the embodiments below, the wide-angle end and the telephoto end refer to the zoom positions corresponding to the limits of a range in which a lens unit for changing magnification (the second lens unit L2) can be mechanically moved along the optical axis.

Features of the zoom lenses according to the embodiments are described below.

The zoom lens according to each of the embodiments includes, in order from the object side to the image side, the first lens unit L1, the second lens unit L2, and the third lens unit L3. The first lens unit L1 is composed of a single negative lens G11. The zoom lens includes five or less lens elements in total. The zoom lens satisfies the following conditions:

$$58 < vd1 \tag{1}$$

$$0.10 < |tkw/tlw| < 0.70 \tag{2}$$

where vd1 is the Abbe number of the material for the negative lens G11 of the first lens unit L1, tkw is the exit pupil distance of the zoom lens at the wide-angle end, and tlw is the total lens length of the zoom lens at the wide-angle end. It should be noted that the term "lens" herein refers to any optical element having a finite power. The exit pupil distance tkw is the distance from the rearmost lens surface to an exit pupil at the wide-angle end. The exit pupil distance tkw is positive if the exit pupil is positioned on the image side of the rearmost lens surface and is negative if the exit pupil is positioned on the object side of the rearmost lens surface. The total lens length tlw is the distance from the first lens surface (the frontmost lens surface) to the image plane IP.

The Abbe number vd1 is represented by the following equation:

$$vd1 = (nd1-1)/(nF1-nC1)$$

where nd1, nF1, and nC1 are the refractive indices of the material for the negative lens G11 at the wavelengths of Fraunhofer lines, namely, the d-line, the F-line, and the C-line, respectively.

The condition (1) specifies the Abbe number of the material for the negative lens G11 of the first lens unit L1. A typical zoom lens corrects different types of aberrations within each lens unit to some extent-to minimize variations in the aberrations occurring in zooming.

The first lens unit L1, however, has difficulty in correcting the aberrations, particularly longitudinal chromatic aberration, by itself because the lens unit L1 is composed of the single negative lens G11.

The zoom lens according to each of the embodiments allows longitudinal chromatic aberrations occurring in the first lens unit L1 and the other lens units to cancel each other out so that the aberrations can be balanced.

Abbe numbers falling below the lower limit of the condition (1) are undesirable because variations in the longitudinal chromatic aberration occurring in the first lens unit L1 can no longer be successfully corrected using the other lens units.

The numerical range of the condition (1) can be advantageously limited to the following range:

$$vd1 > 60 \tag{1a}$$

The numerical range of the condition (1) can be further preferably limited to the following range:

$$vd1 > 80 \tag{1b}$$

In the embodiments, as described above, an extra-low-dispersion material is used for the negative lens G11 to successfully correct chromatic aberration. The material used is not limited to glass and may be any material, such as resin, that satisfies the condition (1).

The condition (2) specifies the position of the exit pupil over the zoom lens. If the resultant value falls below the lower limit of the condition (2), the exit pupil is excessively close to the image plane IP at the wide-angle end. The zoom lens then undesirably provides insufficient peripheral brightness. If the resultant value exceeds the upper limit of the condition (2), the total lens length becomes undesirably large.

The numerical range of the condition (2) can be advantageously limited to the following range:

$$0.20 < |tkw/tlw| < 0.50 \tag{2a}$$

The zoom lens according to each of the embodiments further satisfies the following condition:

$$1.10 < |f1/fw| < 3.00 \tag{3}$$

where f1 is the focal length of the first lens unit L1 and fw is the focal length of the entire system at the wide-angle end.

The condition (3) specifies the focal length of the first lens unit L1. If the resultant value exceeds the upper limit of the condition (3), the zoom lens has a smaller total lens length, but undesirably poses difficulty in correcting aberrations, particularly distortion, over the zoom range thereof. If the resultant value falls below the lower limit of the condition (3), the amount of movement of the first lens unit L1 in zooming increases, and thus the total lens length becomes undesirably large.

The numerical range of the condition (3) can be advantageously limited to the following range:

$$1.30 < |f1/fw| < 2.20 \tag{3a}$$

The zoom lens according to each of the embodiments further satisfies the following condition:

$$0.01 < |(tlt-tlw)/tlw| < 0.15 \tag{4}$$

where tlt is the total lens length of the zoom lens at the telephoto end.

The condition (4) specifies the amount of movement of the lens unit L1 in zooming from the wide-angle end to the telephoto end. If the resultant value exceeds the upper limit of the condition (4), the zoom lens becomes undesirably long when retracted. If the resultant value falls below the lower limit of the condition (4), the lens units L1 to L3 have an excessively high refractive power and thus undesirably pose difficulty in correcting variations in aberrations occurring in zooming.

The numerical range of the condition (4) can be advantageously limited to the following range:

$$0.02 < |(tlt-tlw)/tlw| < 0.10 \tag{4a}$$

The zoom lens according to each of the embodiments further satisfies the following condition:

$$0.3 < |f3/\sqrt{(fw \times ft)}| < 2.00 \tag{5}$$

where f3 is the focal length of the third lens unit L3, fw is the focal length of the entire system at the wide-angle end, and ft is the focal length of the entire system at the telephoto end.

The condition (5) specifies the focal length of the third lens unit L3. If the resultant value exceeds the upper limit of the condition (5), the third lens unit L3 has a low refractive power, and the amount of movement of the third lens unit L3 in zooming increases accordingly. As a result, the total length of the zoom lens becomes undesirably large. If the resultant value falls below the lower limit of the condition (5), the third lens unit L3 has an excessively high refractive power and thus undesirably poses difficulty in correcting aberrations over the zoom range.

The numerical range of the condition (5) can be advantageously limited to the following range:

$$0.6 < |f3/\sqrt{(fw \times ft)}| < 1.80 \tag{5a}$$

The zoom lens according to each of the embodiments further satisfies the following condition:

$$0.20 < f2/\sqrt{(fw \times ft)} < 1.00 \tag{6}$$

where f2 is the focal length of the second lens unit L2.

The condition (6) specifies the focal length of the second lens unit L2. If the resultant value exceeds the upper limit of the condition (6), the second lens unit L2 has a low refractive power, and the amount of movement of the second lens unit L2 in zooming increases accordingly. As a result, the total length of the zoom lens becomes undesirably large. If the resultant value falls below the lower limit of the condition (6), the second lens unit L2 has an excessively high refractive power and thus undesirably poses difficulty in correcting aberrations over the zoom range.

The numerical range of the condition (6) can be advantageously limited to the following range:

$$0.50 < f3/\sqrt{(fw \times ft)} < 0.80 \tag{6a}$$

The zoom lenses according to the embodiments are specifically described below with reference to the drawings.

The zoom lenses according to the first and second embodiments shown in FIGS. 1 and 5, respectively, include, in order from the object side to the image side, the first lens unit L1, which has a negative refractive power, the second lens unit L2, which has a positive refractive power, and the third lens unit L3, which has a positive refractive power. In zooming from the wide-angle end to the telephoto end, the first lens unit L1 moves in a convex locus or path toward the image side, and the other two lens units L2 and L3 move toward the object side. In focusing, the first lens unit L1, the third lens unit L3, or all lens units L1 to L3 move so as to extend the zoom lenses.

The zoom lens according to the third embodiment shown in FIG. 9 includes, in order from the object side to the image side, the first lens unit L1, which has a negative refractive power, the second lens unit L2, which has a positive refractive power, and the third lens unit L3, which has a negative refractive power. In zooming from the wide-angle end to the telephoto end, the first lens unit L1 moves in a convex locus toward the image side, and the other two lens units L2 and L3 move toward the object side. In focusing, the first lens unit L1, the third lens unit L3, or all lens units L1 to L3 move so as to extend the zoom lens.

In each of the embodiments, the first lens unit L1 is composed of the single negative lens G11, which has two aspherical concave surfaces. For a general zoom lens including a first lens unit having a negative refractive power, the frontmost lens thereof tends to have the largest diameter so that a luminous flux specifying the F-number of the zoom lens can enter the zoom lens.

If the first lens unit is composed of a plurality of lenses, the effective lens diameter thereof must be increased to ensure entry of the required luminous flux.

In addition, as the lenses of the first lens unit have a larger curvature (a higher refractive power), they have a larger thickness and are separated by larger axial air spaces. Accordingly, the first lens unit L1 may be composed of the minimum number of lenses, namely, a single lens.

In zooming, the first lens unit L1 moves toward and away from the image side in a convex path to successfully correct field curvature at the intermediate zoom position.

In each of the embodiments, the second lens unit L2 includes three lens elements in total.

In the first embodiment, the second lens unit L2 includes, in order from the object side to the image side, a cemented lens including a biconvex positive lens and a meniscus negative lens having a concave surface on the object side and a meniscus negative lens having a concave surface on the image side.

In the second embodiment, the second lens unit L2 includes, in order from the object side to the image side, a meniscus positive lens having a convex surface on the object side, a biconvex positive lens, and a meniscus negative lens having a concave surface on the image side.

In the third embodiment, the second lens unit L2 includes, in order from the object side to the image side, a cemented lens including a biconvex positive lens and a meniscus negative lens having a concave surface on the object side and a meniscus negative lens having a concave surface on the object side.

In each of the embodiments, as described above, a positive lens is disposed on the frontmost side of the second lens unit L2 to decrease the angles of refraction of off-axis principal rays passing through the first lens unit L1, thus reducing off-axis aberrations. In addition, the aperture stop SP is disposed on the object side of the second lens unit L2 to reduce the distance between the first lens unit L1 and an entrance pupil at the wide-angle end. This arrangement inhibits an increase in the effective lens diameter of the first lens unit L1 and allows off-axis aberrations caused by the first lens unit L1 and the third lens unit L3 to cancel each other out.

In zooming, the second lens unit L2, which mainly serves to change magnification, moves to the object side to reduce variations in aberrations.

The third lens unit L3 is composed of a single positive or negative lens. In the first and second embodiments, the third lens unit L3 is composed of a meniscus positive lens having a concave surface on the object side. In the third embodiment, the third lens unit L3 is composed of a meniscus negative lens having a concave surface on the image side.

In zooming, the third lens unit L3 moves to the object side to assist in changing magnification, thus contributing to the size reduction of the entire optical system.

With the lens configurations described above, the zoom lenses according to the embodiments deliver excellent optical performance over the zoom range thereof despite including fewer lenses.

The embodiments described above may also be applied to zoom lenses in which the distances between three lens units are changed in zooming by moving two of them (for example, first and second, first and third, or second and third lens units) rather than by moving all three lens units.

In addition, another lens unit having a low refractive power may be disposed on the image side of the third lens unit L3.

A digital still camera (image pickup apparatus) according to an embodiment of the present invention will be described below with reference to FIG. 13. This digital still camera includes a zoom lens system according to the present invention as an imaging optical system.

In FIG. 13, the digital still camera includes a camera body 20, an imaging optical system 21 including the zoom lens according to the present invention, a solid-state image pickup element (photoelectric transducer) 22, such as a CCD sensor or a CMOS sensor, incorporated in the camera body 20 to receive a subject image formed by the imaging optical system 21, a memory 23 for recording information on the subject image after photoelectric conversion by the image pickup element 22, and a viewfinder 24 including, for example, a liquid display panel to allow the observation of the subject image formed on the image pickup element 22.

Zoom lens systems according to the present invention can thus be applied to image pickup apparatuses such as digital still cameras to provide compact image pickup apparatuses with high optical performance.

Numerical data on the first to third embodiments of the present invention are shown below. In the data on the embodiments, i indicates the order of optical surfaces from the object side to the image side; ri indicates the radius of curvature of the i-th optical surface; di indicates the axial distance between the i-th and (i+1)th surfaces; ni indicates the refractive index of the material for the i-th optical element for the d-line; vi indicates the Abbe number of the material for the i-th optical element; f indicates a focal length; fno indicate an F-number; and ω indicates a half-angle of view.

The shape of an aspherical surface is represented by the following equation:

$$x(h) = \frac{(1/r)h^2}{1 + \sqrt{\{1 - (1+k)(h/r)^2\}}} + Ah^4 + Bh^6 + Ch^8 + Dh^{10} \cdots$$

wherein x is a displacement from the apex of the surface in the optical-axis direction, h is a height from the optical axis in a direction perpendicular thereto, r is a paraxial radius of curvature, k is a conic constant, and B, C, D, E, and the subsequent symbols are aspherical coefficients of different orders.

The symbol "D±XX" used in the values of aspherical coefficients refers to multiplication by 10 to the ±XX-th power. The symbol "asphi" indicates that the i-th surface has an aspherical shape.

In the embodiments, the two rearmost surfaces are flat surfaces (radius of curvature: ∞) that define the optical block GB. Table 1 shows the resultant values of the conditions (1) to (6) in the embodiments.

| First embodiment | | | |
|---|---|---|---|
| f = 6.55005~18.50976 | | fno = 1:2.95~5.44 | 2ω = 56.91°~21.71° |

| | | | | |
|---|---|---|---|---|
| r 1 = −1650.695 | d 1 = 1.00 | n 1 = 1.43425 | ν 1 = 95.0 |
| r 2 = 5.654 | d 2 = Variable | | |
| r 3 = (Aperture) | d 3 = 0.15 | | |
| r 4 = 3.062 | d 4 = 3.33 | n 2 = 1.59240 | ν 2 = 68.3 |
| r 5 = −2.457 | d 5 = 1.00 | n 3 = 1.60970 | ν 3 = 57.8 |
| r 6 = −24.900 | d 6 = 0.54 | | |
| r 7 = 24.219 | d 7 = 1.00 | n 4 = 2.00330 | ν 4 = 28.3 |
| r 8 = 3.341 | d 8 = Variable | | |
| r 9 = −34.161 | d 9 = 1.73 | n 5 = 1.69320 | ν 5 = 33.7 |
| r10 = −6.806 | d10 = Variable | | |
| r11 = ∞ | d11 = 1.00 | n 6 = 1.51633 | ν 6 = 64.1 |
| r12 = ∞ | | | |

| Variable | Focal length | | |
|---|---|---|---|
| distance | 6.55 | 13.10 | 18.51 |
| d 2 | 10.99 | 3.85 | 1.50 |
| d 8 | 1.00 | 1.98 | 2.18 |
| d 10 | 2.41 | 5.75 | 9.12 |

| no | r | k | B | C | D | E |
|---|---|---|---|---|---|---|
| asph 1 | −1.65069D+03 | −6.35771D+20 | −4.62747D−03 | 3.39569D−04 | −1.18838D−05 | 1.61985D−07 |
| asph 2 | 5.65440D+00 | −2.89909D+00 | −3.94637D−03 | 3.57276D−04 | −9.93460D−06 | 0.00000D+00 |
| asph 4 | 3.06208D+00 | −6.63995D−01 | 1.65728D−03 | 1.35204D−04 | −2.33714D−06 | 2.66930D−06 |
| asph 7 | 2.42194D+01 | −2.28578D+03 | −1.25376D−02 | −1.89498D−02 | 1.38343D−02 | −6.25315D−03 |
| asph 8 | 3.34055D+00 | 1.43887D+00 | −3.18311D−02 | 2.01422D−03 | −4.41138D−04 | 0.00000D+00 |
| asph 9 | −3.41608D+01 | −9.81585D+02 | 2.76159D−03 | 1.19125D−03 | −8.52723D−05 | 0.00000D+00 |
| asph 10 | −6.80510D+00 | −1.83610D+00 | 8.51306D−04 | 2.44700D−04 | 4.24945D−05 | 0.00000D+00 |

| Second embodiment | | | |
|---|---|---|---|
| f = 6.55022~18.51052 | | fno = 1:2.95~5.48 | 2ω = 56.91°~21.71° |

| | | | |
|---|---|---|---|
| r 1 = −1297.328 | d 1 = 1.00 | n 1 = 1.43425 | ν 1 = 95.0 |
| r 2 = 5.825 | d 2 = Variable | | |
| r 3 = (Aperture) | d 3 = 0.15 | | |
| r 4 = 3.085 | d 4 = 2.12 | n 2 = 1.56907 | ν 2 = 71.3 |
| r 5 = 92.239 | d 5 = 0.68 | | |
| r 6 = 12.015 | d 6 = 1.65 | n 3 = 1.43425 | ν 3 = 95.0 |
| r 7 = −11.330 | d 7 = 0.15 | | |
| r 8 = 73.097 | d 8 = 1.00 | n 4 = 2.00330 | ν 4 = 28.3 |
| r 9 = 3.362 | d 9 = Variable | | |
| r10 = −18.925 | d10 = 1.57 | n 5 = 1.90680 | ν 5 = 21.2 |
| r11 = −9.145 | d11 = Variable | | |
| r12 = ∞ | d12 = 1.00 | n 6 = 1.51633 | ν 6 = 64.1 |
| r13 = ∞ | | | |

| Variable | Focal length | | |
|---|---|---|---|
| distance | 6.55 | 13.10 | 18.51 |
| d 2 | 10.80 | 3.89 | 1.69 |
| d 9 | 1.00 | 2.06 | 2.28 |
| d 11 | 2.23 | 4.92 | 7.84 |

| no | r | k | B | C | D | E |
|---|---|---|---|---|---|---|
| asph 1 | −1.29733D+03 | −7.03043D+20 | −4.88347D−03 | 3.66090D−04 | −1.27745D−05 | 1.81740D−07 |
| asph 2 | 5.82529D+00 | −6.24871D+00 | −2.34942D−03 | 2.51874D−04 | −5.72564D−06 | 0.00000D+00 |
| asph 4 | 3.08475D+00 | −7.91850D−01 | 1.25893D−03 | 9.20108D−05 | 9.36884D−06 | 0.00000D+00 |
| asph 5 | 9.22388D+01 | −6.40865D+03 | 1.42632D−03 | 7.07792D−05 | 4.59889D−05 | 0.00000D+00 |
| asph 6 | 1.20152D+01 | 3.40860D+01 | 3.79165D−03 | 2.79351D−04 | 0.00000D+00 | 0.00000D+00 |
| asph 7 q | −1.13296D+01 | 5.20987D+01 | −1.23155D−02 | −5.60822D−03 | 2.83344D−03 | 0.00000D+00 |
| asph 8 | 7.30974D+01 | −4.91272D+04 | −3.81304D−02 | −1.79743D−02 | 1.37313D−02 | −5.95963D−03 |
| asph 9 | 3.036157D+00 | 6.37297D−01 | −4.08260D−02 | 6.08501D−03 | −4.70385D−04 | 0.00000D+00 |

| Third embodiment | | | |
|---|---|---|---|
| f = 6.55004~18.50973 | fno = 1:3.99~7.46 | | 2ω = 56.91°~21.71° |
| r 1 = −75.378 | d 1 = 1.00 | n 1 = 1.43425 | ν 1 = 95.0 |
| r 2 = 4.625 | d 2 = Variable | | |
| r 3 = (Aperture) | d 3 = 0.10 | | |
| r 4 = 3.783 | d 4 = 2.95 | n 2 = 1.48563 | ν 2 = 85.2 |
| r 5 = −4.850 | d 5 = 1.00 | n 3 = 1.83500 | ν 3 = 43.0 |
| r 6 = −8.289 | d 6 = 0.71 | | |
| r 7 = −33.622 | d 7 = 1.57 | n 4 = 1.43425 | ν 4 = 95.0 |
| r 8 = −15.669 | d 8 = Variable | | |
| r 9 = 5.169 | d 9 = 1.00 | n 5 = 1.77250 | ν 5 = 49.6 |
| r10 = 2.654 | d10 = Variable | | |
| r11 = ∞ | d11 = 1.00 | n 6 = 1.51633 | ν 6 = 64.1 |
| r12 = ∞ | | | |

| Variable | Focal length | | |
|---|---|---|---|
| distance | 6.55 | 13.10 | 18.51 |
| d 2 | 12.77 | 6.84 | 5.07 |
| d 8 | 0.50 | 0.58 | 0.65 |
| d 10 | 5.05 | 9.84 | 13.71 |

| | r | k | B | C | D | E |
|---|---|---|---|---|---|---|
| asph 1 | −7.53778D+01 | −3.04304D+03 | 0.00000D+00 | 0.00000D+00 | 0.00000D+00 | 0.00000D+00 |
| asph 2 | 4.62468D+00 | 2.20884D−01 | 2.91753D−04 | −9.51856D−05 | 0.00000D+00 | 0.00000D+00 |
| asph 4 | 3.78283D+00 | 1.73138D−01 | −7.20561D−04 | 0.00000D+00 | 0.00000D+00 | 0.00000D+00 |
| asph 7 | −3.36219D+01 | 1.86176D+02 | −7.92408D−03 | −1.57435D−03 | 0.00000D+00 | 0.00000D+00 |
| asph 8 | −1.56691D+01 | 4.62121D+01 | −2.85427D−02 | 2.27792D−03 | 0.00000D+00 | 0.00000D+00 |
| asph 9 q | 5.16862D+00 | −7.79561D+00 | −3.04906D−02 | 3.40941D−04 | 4.61770D−04 | 0.00000D+00 |
| asph 10 | 2.65370D+00 | −2.13577D+00 | −2.35197D−02 | 2.62956D−03 | 0.00000D+00 | 0.00000D+00 |

TABLE 1

| Condition/ | First embodiment | Second embodiment | Third embodiment |
|---|---|---|---|
| (1) | 95.00000 | 95.00000 | 95.00000 |
| (2) | 0.39075 | 0.35600 | 0.32032 |
| (3) | 1.98079 | 2.03833 | 1.52615 |
| (4) | 0.06745 | 0.09762 | 0.03920 |
| (5) | 1.08549 | 1.64674 | 0.77559 |
| (6) | 0.65964 | 0.61441 | 0.60402 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-169344 filed Jun. 9, 2005, which is hereby incorporated by reference herein in its entirety.

What is claimed is:

1. A zoom lens system comprising:
a frontmost first lens unit having a negative optical power, the first lens unit consisting of a negative lens element; and
a plurality of lens units on the rear side of the first lens unit,
wherein the distances between the adjacent lens units are changed in zooming,
the zoom lens system including five or less lens elements in total,
the zoom lens system satisfying the following conditions:

$$58 < vd1$$

$$0.10 < |tkw/tlw| < 0.70$$

wherein vd1 is the Abbe number of the material for the negative lens element, tkw is the distance from the rearmost lens surface to an exit pupil at a wide-angle end, and tlw is the total lens length of the zoom lens system at the wide-angle end, and wherein the following condition is additionally satisfied:

$$0.01 < |(tlt-tlw)/tlw| < 0.15$$

wherein tlt is the total lens length of the zoom lens system at a telephoto end.

2. The zoom lens system according to claim 1, further satisfying the following condition:

$$1.10 < |f1/fw| < 3.00$$

wherein f1 is the focal length of the first lens unit and fw is the focal length of the entire system at the wide-angle end.

3. The zoom lens system according to claim 1, wherein the rear lens units include, in order from an object side to an image side:
a second lens unit having a positive optical power; and
a third lens unit.

4. The zoom lens system according to claim 3, further satisfying the following condition:

$$0.30 < |f3/\sqrt{(fw \times ft)}| < 2.00$$

wherein f3 is the focal length of the third lens unit, fw is the focal length of the entire system at the wide-angle end, and ft is the focal length of the entire system at a telephoto end.

5. The zoom lens system according to claim 3, further satisfying the following condition:

$$0.20 < f2/\sqrt{(fw \times ft)} < 1.00$$

wherein f2 is the focal length of the second lens unit, fw is the focal length of the entire system at the wide-angle end, and ft is the focal length of the entire system at a telephoto end.

6. The zoom lens system according to claim 3, further comprising an aperture stop between the first and second lens units.

7. The zoom lens system according to claim 3, wherein at least one of the second and third lens units includes an aspherical lens.

8. The zoom lens system according to claim 1, wherein the negative lens element has an aspherical surface.

9. The zoom lens system according to claim 1, forming an image on a solid-state image pickup element.

10. An image pickup apparatus comprising:
a solid-state image pickup element; and
the zoom lens system according to claim 1, for forming an image on the solid-state image pickup element in use.

* * * * *